US010632680B2

(12) United States Patent
Robinson (10) Patent No.: US 10,632,680 B2
(45) Date of Patent: *Apr. 28, 2020

(54) 3D PRINTED PIN AND VOID SYSTEMS AND METHODS

(71) Applicant: Ghost Capital, Inc., Cincinnati, OH (US)

(72) Inventor: Brian Quincy Robinson, Cincinnati, OH (US)

(73) Assignee: GHOST CAPITAL, INC., West Palm Beach, FL (US)

(*) Notice: Subject to any disclaimer, the term of this patent is extended or adjusted under 35 U.S.C. 154(b) by 91 days.

This patent is subject to a terminal disclaimer.

(21) Appl. No.: 15/913,343

(22) Filed: Mar. 6, 2018

(65) Prior Publication Data

US 2018/0194069 A1    Jul. 12, 2018

Related U.S. Application Data

(63) Continuation of application No. 14/675,091, filed on Mar. 31, 2015, now Pat. No. 9,944,022.

(60) Provisional application No. 62/052,223, filed on Sep. 18, 2014, provisional application No. 62/104,154, filed on Jan. 16, 2015.

(51) Int. Cl.
*G05B 19/4099* (2006.01)
*B29C 67/00* (2017.01)
*B29C 64/386* (2017.01)
*B33Y 50/02* (2015.01)

(52) U.S. Cl.
CPC ........ *B29C 64/386* (2017.08); *G05B 19/4099* (2013.01); *B33Y 50/02* (2014.12); *G05B 2219/35134* (2013.01); *G05B 2219/49007* (2013.01); *Y02P 90/265* (2015.11)

(58) Field of Classification Search
CPC ... B29C 64/386; B33Y 50/02; G05B 19/4099; G05B 2219/35134; G05B 2219/49007; Y02P 90/265

See application file for complete search history.

(56) References Cited

U.S. PATENT DOCUMENTS

| | | | |
|---|---|---|---|
| 7,492,605 B2* | 2/2009 | Li | H05K 1/0254 174/250 |
| 9,429,935 B2* | 8/2016 | Boyl-Davis | G05B 19/40931 |
| 9,944,022 B2* | 4/2018 | Robinson | B29C 64/386 |
| 2005/0251283 A1* | 11/2005 | Shovan | G05B 19/4099 700/145 |
| 2008/0205763 A1* | 8/2008 | Marsh | B64F 5/10 382/190 |
| 2013/0059436 A1* | 3/2013 | Rinerson | G11C 11/5685 438/598 |

(Continued)

*Primary Examiner* — Abdelmoniem I Elamin
(74) *Attorney, Agent, or Firm* — Ulmer & Berne LLP (57) ABSTRACT

Embodiments include an apparatus, generated at least partially using a 3D printer, the apparatus including an object, the object being at least partially fabricated from a 3D printer, the object including a first part of the object, the first part of the object defining a first void and a second part of the object, the second part of the object defining a second void. The apparatus can include a pin, the pin having a first end and a second end, where the first end of the pin engages the first void of the object and the second end of the pin engages the second end of the pin such that the first part is coupled with the second part to form the object.

17 Claims, 11 Drawing Sheets

(56) References Cited

U.S. PATENT DOCUMENTS

2014/0303764 A1* 10/2014 Boyl-Davis ...... G05B 19/40931
  700/98
2015/0246278 A1* 9/2015 Ritter ...................... A63C 5/02
  280/626

* cited by examiner

3D PRINTED PIN AND VOID SYSTEMS AND METHODS

REFERENCE TO RELATED APPLICATIONS

This application is a continuation of U.S. Non-Provisional patent application Ser. No. 14/675,091, filed Mar. 31, 2015, now U.S. Pat. No. 9,944,022, which claims priority to U.S. Provisional Patent Application No. 62/104,154 filed on Jan. 16, 2015 and U.S. Provisional Patent Application No. 62/052,223 filed on Sep. 18, 2014, the disclosures of which are incorporated by reference herein in their entirety.

TECHNICAL FIELD

Embodiments of the technology relate, in general, to a pin and void model for connecting 3D-printed objects, and in particular to systems and methods of generating pins and voids in computer-aided-design (CAD) models and printing the same using 3D printers.

BACKGROUND

In recent years, 3D printing has been demonstrated to be an effective technique for accurately forming 3D objects, such as for the purpose of prototyping and manufacture. In its most general sense, 3D printing typically utilizes a 3D scanner and/or computer software to generate an image map of a desired object. That image map is then translated into a grid-like structure such that a fabrication device can deposit a flowable material, such as a plastic, polymer, biomaterial or resin, via an additive process, which is simultaneously solidified creating a 3D object. Various existing 3D printing methodologies which provide unique advantages and also each have their own disadvantages.

BRIEF DESCRIPTION OF THE DRAWINGS

The present disclosure will be more readily understood from a detailed description of some example embodiments taken in conjunction with the following figures.

SUMMARY

Embodiments include a method of generating a 3D-printable object and an associated pin including selecting an object to be fabricated with a 3D printer, designing the object with a computer aided design program having a pin and void template, separating the object into a first part and a second part using the computer aided design program, designing a first void defined by the first part, designing a second void defined by the second part, designing a pin, where the pin is sized to engage the first void and the second void, printing the first part, the second part, and the pin with the 3D printer, and coupling the first part to the second part with the pin to assemble the object.

Embodiments include an apparatus, generated using a 3D printer, the apparatus including an object, the object being fabricated from a 3D printer, the object including a first part of the object, the first part of the object defining a first void and a second part of the object, the second part of the object defining a second void. The apparatus can include a pin, the pin having a first end and a second end, where the first end of the pin engages the first void of the object and the second end of the pin engages the second end of the pin such that the first part is coupled with the second part to form the object.

An apparatus, generated using a 3D printer, including a first object, the first object being fabricated from a 3D printer, the object defining a void, where the void includes an substantially dog bone shaped configuration aperture and an indented portion and a second object, the second object being fabricated from a 3D printer, the second object including a pin having a pair of laterally flexible projections, where the pin engages the void via the aperture of the first object such that the first object is coupled with the second object and retained within the void by the indented portion.

DETAILED DESCRIPTION

Various non-limiting embodiments of the present disclosure will now be described to provide an overall understanding of the principles of the structure, function, and use of pin and void systems and methods disclosed herein. One or more examples of these non-limiting embodiments are illustrated in the selected examples disclosed and described in detail with reference made to FIGS. 1-11 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Described herein are example embodiments of systems and methods for incorporating pins and/or voids into 3D-printable objects. Although the present disclosure may be described in terms of a pin or a void and 3D-printable objects, this is done for convenience and ease of exposition only. The inventive principles described herein can be applied to both pins and voids as well as objects that have not been 3D-printed, as would be understood by one of ordinary skill in the art.

3D printing, also known as additive manufacturing, has historically been employed as a method to develop prototypes. The prototypes are generally created by advanced engineering professionals with experience using sophisticated CAD programs. In recent years, the cost of 3D printing hardware has dropped such that small businesses, serious hobbyists, and ordinary consumers can afford to purchase or use 3D-printing technology. However, creating 3D-printable objects generally still requires creating CAD files using CAD programs that are output into a format readable by 3D printers, such as a stereolithography file (.STL) that uses standard tessellation language. A wide range of CAD programs are commercially available. However most users require at least some training and experience using a CAD program in order to make even simple geometric forms such as a cup or cylinder. It can be a challenge for users to develop CAD models for their designs or products while also taking into account manufacturing and design constraints specific to 3D-printing technology.

For example, due to design constraints specific to 3D-printing technology, the end product can require joining multiple 3D-printed parts. In another example, a 3D-printed part may need to be joined to a traditionally manufactured part that is not a 3D-printed part. For example, one or more parts to which a 3D-printed part is to be joined may be created using injection molding, computer numerical control (CNC) machining, or some other traditional form of manufacturing parts as would be understood in the art. In yet another example, the end product may be designed to have interchangeable parts that are assembled either by a factory worker or by the end user. For example, a toy can come with a number of interchangeable parts for a child to customize and play with their toy.

A system and method for incorporating pins and/or voids into 3D-printable objects provides a two-part model for joining a 3D-printable object to another object, which may also be a 3D-printable object. The disclosed system and method allows scalable pins and/or voids to be used in a CAD program, allowing a suitably configured pin and/or void to be incorporated into the design of a 3D-printable object, and allowing instructions for making the 3D-printable object to be output in a format that is directly or indirectly usable by a 3D printer to make the 3D-printable object with the required pins and/or voids. The disclosed pin and void system allows for the fabrication of objects on a 3D printer without requiring additional support structures during fabrication, which generally require removal and resurfacing in post-production. The pin and void system also allows for attachment of the models' parts or attachment of the model to another object without need for glue in post-production The embodiments described herein make the creation of 3D-printed objects easier, less time consuming, less wasteful of material, and more efficient for users of varied skill levels. The disclosed pin and void system also facilitates and guides designers and users in the design and selection of customized pins and voids to accomplish the objectives described in this disclosure.

Figure 1:
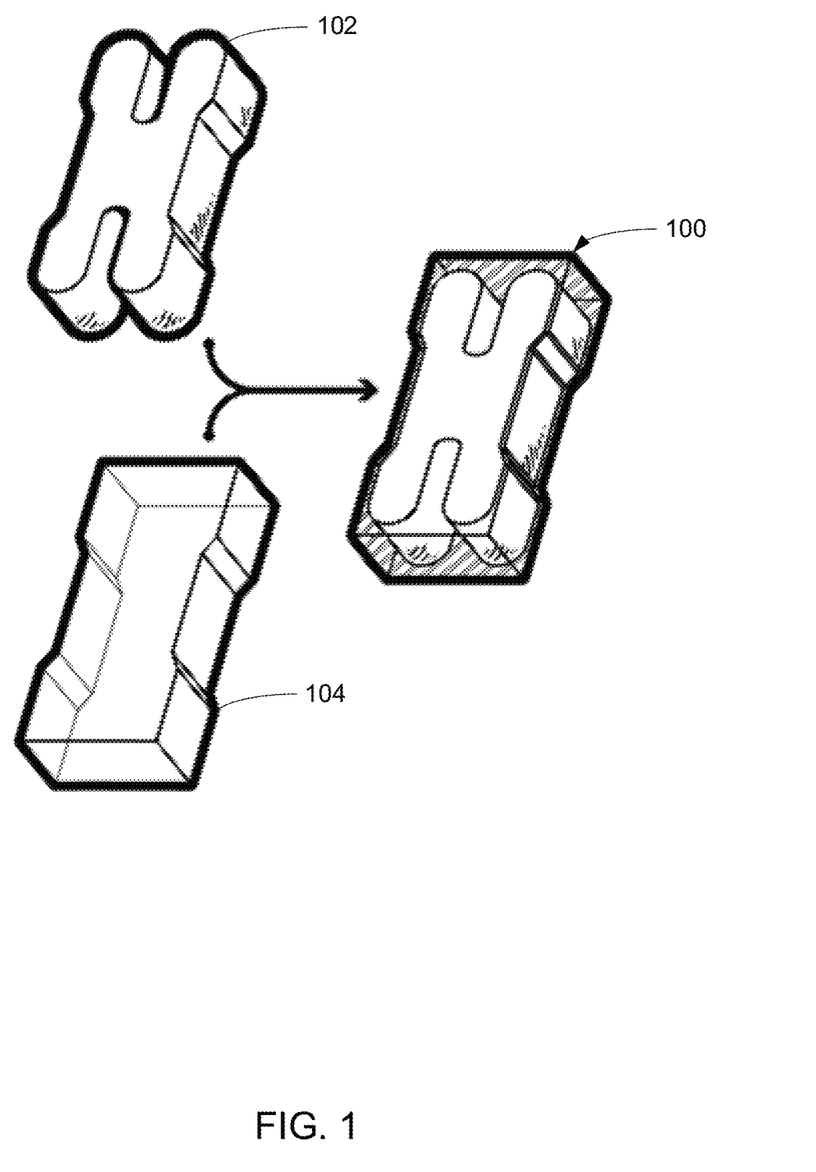
FIG. 1 depicts a CAD model of an example pin and an associated void, according to one embodiment.

Referring to FIG. 1, an embodiment of a computer-aided-design (CAD) model, CAD model 100, is presented. In the CAD model 100, a pin 102 is configured to fit inside of the space defined by a void 104. The pin 102 and void 104 can be configured such that, when parts having a pin 102 or void 104 are manufactured or 3D-printed, the parts have the desired tolerances to achieve design goals. Example design goals can include a loose fit between 3D-printed parts that allows some lateral, vertical, or rotational movement, a tight fit between 3D-printed parts that inhibits movement, a pin 102 of one part that can be repeatedly inserted and pulled out or extracted from a void 104 in another part without damaging either part, and a pin 102 that would be difficult or require substantial force to pull out of a void 104 in another 3D-printed part such that removal would be likely to cause deformation or damage to a part. The tolerances selected for the pin 102 and void 104 can depend upon the rigidity and strength of the materials used in the 3D printing of the parts, as well as the precision of the 3D printer itself. Other design goals and tolerances can be used as would be understood by one of ordinary skill in the art.

Figure 2A:
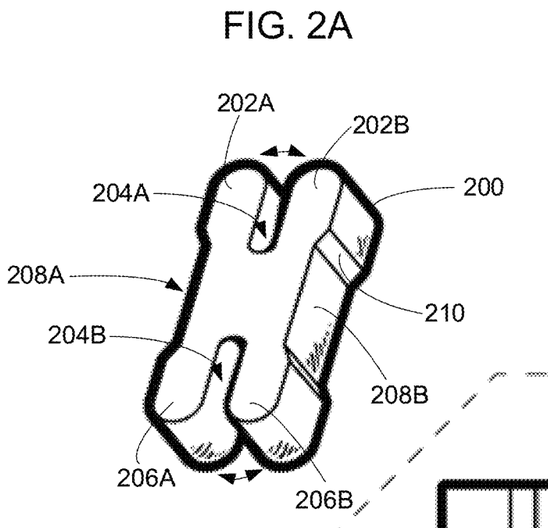
FIG. 2A depicts an isometric view of an example pin, according to one embodiment.

Referring now to FIG. 2A, an isometric view of an embodiment of a pin 200 is presented. A pin 200 can include a first set of protrusions 202A, 202B that can be separated by a first gap 204A and a second set of protrusions 206A, 206B that can be separated by a second gap 204B. The pin 200 can include a first indent 208A between one of the first protrusions 202A and one of the second protrusions 206A, and a second indent 208B between the other of the first protrusions 202B and the other of the second protrusions 206B. In an embodiment, the first set of protrusions 202A, 202B can be configured to bend or flex in the direction of one another, such as inwardly and outwardly, as illustrated by the curvilinear arrows such that the first gap 204A narrows. Similarly the second set of protrusions 206A, 206B are configured to bend in the direction of one another as illustrated by the curvilinear arrows such that the second gap 204B narrows. This bending or flexing can allow the width of the pin 200 at the protrusions 202A, 202B, 206A, 206B to decrease, allowing the pin 200 to be inserted into a void (not shown; see for example FIG. 7 among other figures) or removed from the void. Detent walls 210 can be angled, shaped, or otherwise modified to facilitate or inhibit the insertion or removal of the pin 200 from a void. By adjusting the angle or shape of the detent walls 210, contact forces between the detent walls 210 and a void can be configured to facilitate the bending of the protrusions 202A, 202B, 206A, 206B during removal of the pin 200 from a void. The detent walls 210 can be configured in conjunction with the shape of a void, or independently of the void, in order to facilitate the insertion and removal of the pin 200 into the void, inhibit the removal of the pin 200 from the void, or lock the pin 200 in the void as would be understood by one of ordinary skill in the art. In one embodiment, the pin 200 can have a substantially dog bone-shaped configuration.

Figure 2B:
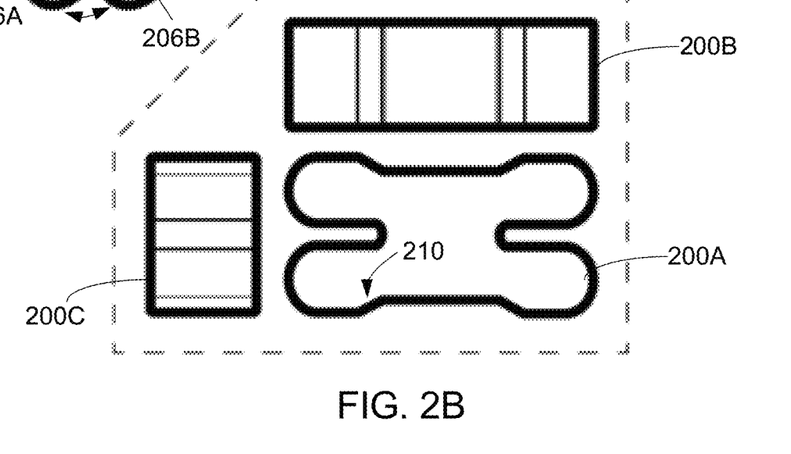
FIG. 2B depicts orthographic views of the example pin of FIG. 2A, according to one embodiment.

Referring now also to FIG. 2B, orthographic views 200A, 200B, 200C of the pin 200 are presented, including a top view 200A of the pin 200, a side view 200B of the pin 200 along the long axis of the pin 200, and a side view 200C of the pin 200 along the short axis of the pin 200. In this embodiment of the pin 200, the detent walls 210 are angled such that when the pin 200 is being removed from a void, the forces impinging upon the detent walls 210 will bend the ends of the pin 200 inward, allowing the pin 200 to narrow at the ends and be removed from a void.

Figures 3A, 3B:
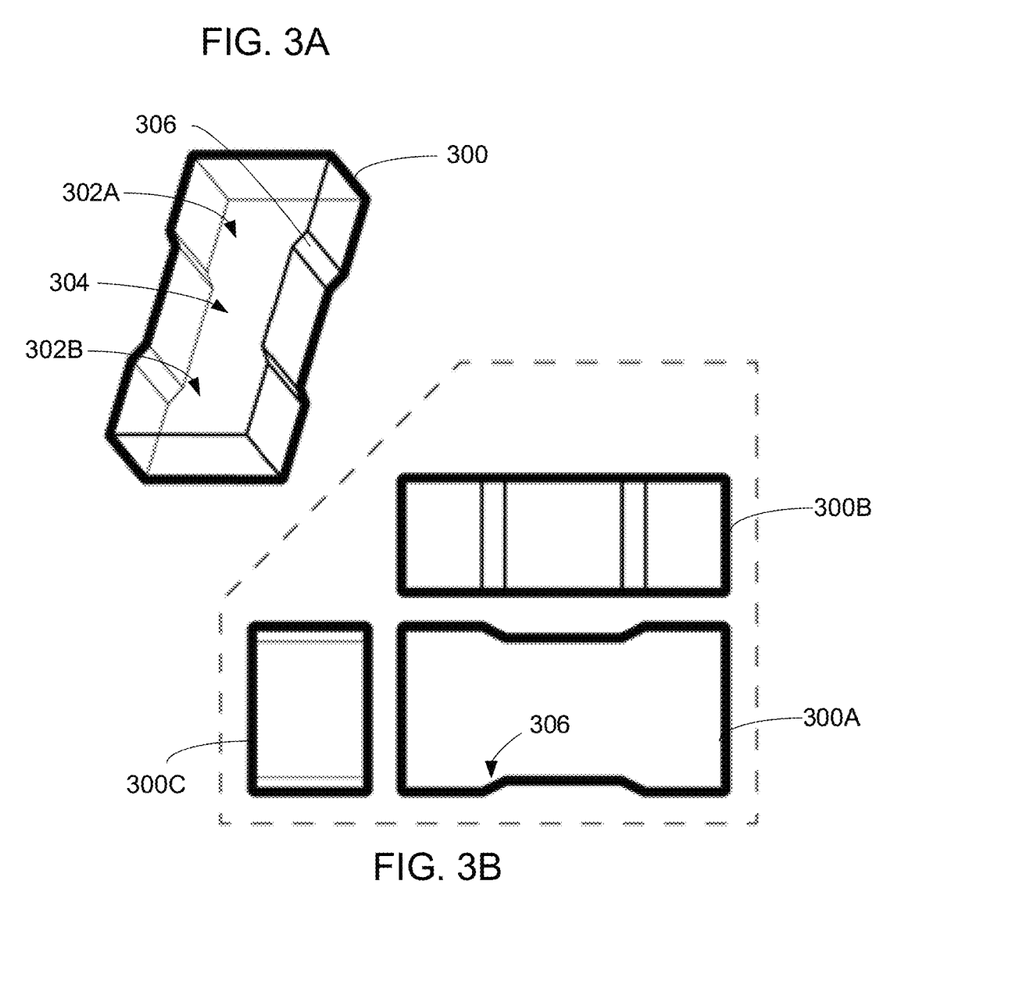
FIG. 3A depicts an isometric view of an example void associated with FIGS. 2A and 2B, according to one embodiment.
FIG. 3B depicts orthographic views of the example void of FIG. 3A, according to one embodiment.

Referring now to FIG. 3A, an isometric view of an embodiment of a void 300 is presented. The void 300 has a first cavity 302A at a first end, and a second cavity 302B at a second end. Between the first cavity 302A and the second cavity 302B is an indented cavity 304. The void 300 can be configured with detent walls 306 to facilitate or inhibit the insertion and removal of a pin (not shown; see for example FIGS. 2 and 7). Referring now also to FIG. 3B, orthographic views 300A, 300B, 300C of the void 300 are presented, including a top view 300A of the void 300, a side view 300B of the void 300 along the long axis of the void 300, and a side view 300C of the void 300 along the short axis of the void 300. In this embodiment of the void 300, the detent walls 306 of the void 300 are angled such that when a pin is to be removed from the void 300, the forces from the detent walls 306 of the void 300 impinge upon the detent walls of the pin which bend the ends of the pin inward, allowing the pin to narrow at the ends and be removed from the void 300. In an embodiment, the material surrounding the indented cavity 304 can be configured to flex or distend to allow removal of a pin from a void cavity 302A, 302B. In an embodiment, the pin can be a rigid pin. In this embodiment, the material surrounding the void 300 can be configured to flex or distend to allow insertion and/or removal of the rigid pin.

Figure 4A:
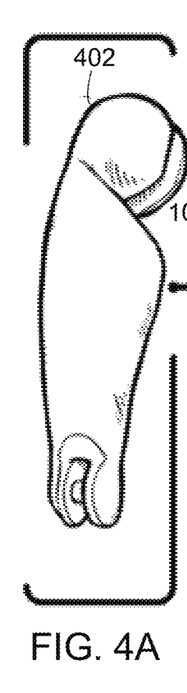
FIGS. 4A-4D depict an example incorporation of a void, as part of a pin and void system, into a 3D-printable item, according to one embodiment.
Figure 4B:
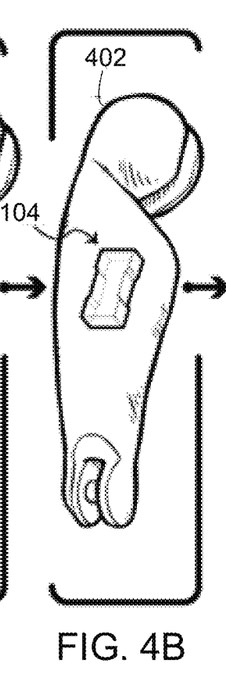
Figure 4C:
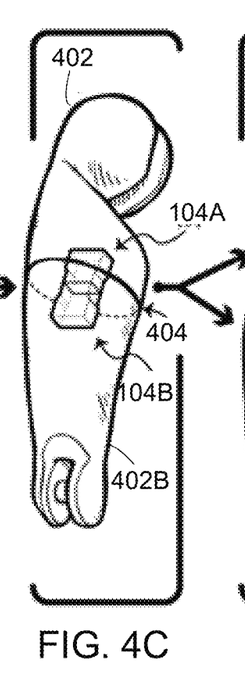
Figure 4D:
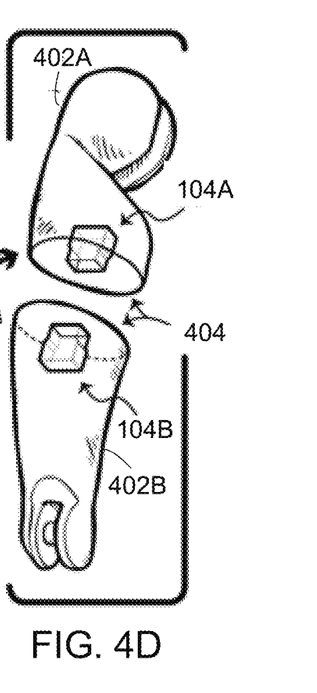

Referring now to FIGS. 4A-4D, example operations illustrating the incorporation of void 104, of a pin and void system, into the CAD drawings 400 of a 3D-printable item 402 are presented. In FIG. 4A, the CAD drawing 400 of a 3D-printable item 402 is selected. In FIG. 4B, a void 104 is placed in a suitable position in the interior of the item 402. For example, the void 104 can be placed approximately in the midpoint of the item 402. In FIG. 4C, based on the position of the void 104, the item 402 can be bisected along a plane 404 such that the item 402 can be divided into a first part of the item 402A and a second part of the item 402B and separately 3D printed. In a configuration, the plane 404 and void 104 can be configured such that the plane 404 also divides the void 104 into two equal halves, void space 104A and void space 104B, within the indented portion of the void 104 such that each void space 104A, 104B includes a portion of the indented portion and a separate cavity. In various configurations, the plane 404 can be a shaped surface that is not flat and therefore not a true plane, or the plane 404 can divide the void 104 unequally as explained in greater detail with regard to FIG. 6 and the associated detailed description.

Figure 5A:
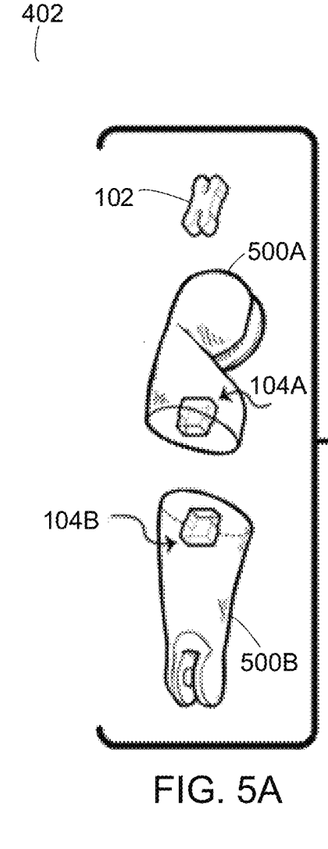
FIGS. 5A-5C depict an example assembly of the 3D-printable items of FIGS. 4A-4D using the pin and void system, according to one embodiment.
Figure 5B:
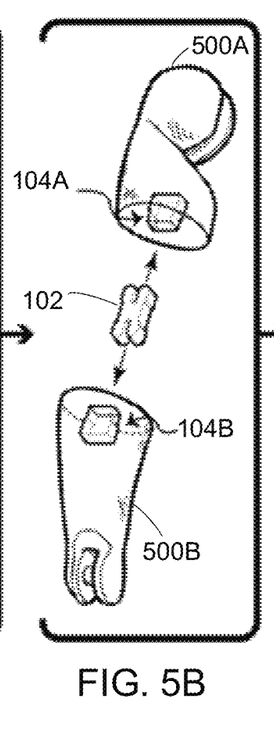
Figure 5C:
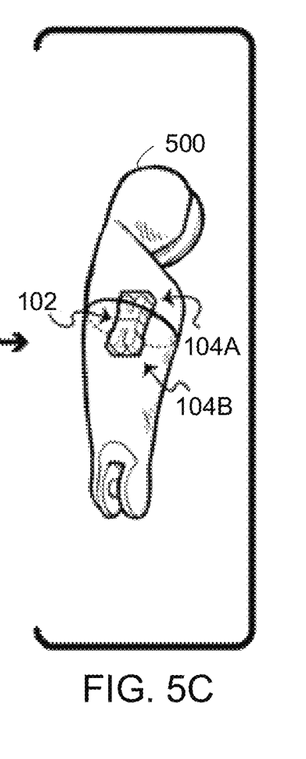

Referring now to FIGS. 5A-5C, example operations illustrating the assembly of a 3D-printed item 500 using a pin and void system 102, 104 is presented. A first part of the 3D-printed item 500A can be fabricated, for example by 3D printing the first part of the item 402A from the CAD drawing 400 of FIG. 4D. Similarly, a second part of the 3D-printed item 500B can be fabricated by 3D printing the second part of the item 402B using the CAD drawing 400 of FIG. 4D. Additionally, a pin 102 can be fabricated, for example by 3D printing the pin 102 or by manufacturing the pin 102 using some other process such as injection molding or stamping. The pin 102 can be configured to be inserted into void space 104A and void space 104B as illustrated in FIGS. 5B and 5C. In FIG. 5B, the first part of the 3D-printed item 500A and the second part of the 3D-printed item 500B can be aligned such that pin 102 can be inserted into void space 104A and void space 104B. The pin 102 can be first inserted into either part 500A, 500B, or can be inserted into both parts 500A, 500B at approximately the same time. The two parts 500A, 500B can be brought together and the pin 102 can be retained in void space 104A and void space 104B to secure the two parts 500A, 500B together into the assembled item 500. In an embodiment, other force-generating means also can be used to secure the parts 500A, 500B, for example glue, welding or melting of the parts 500A, 500B, and other such means as would be understood by one of ordinary skill in the art.

Figure 6:
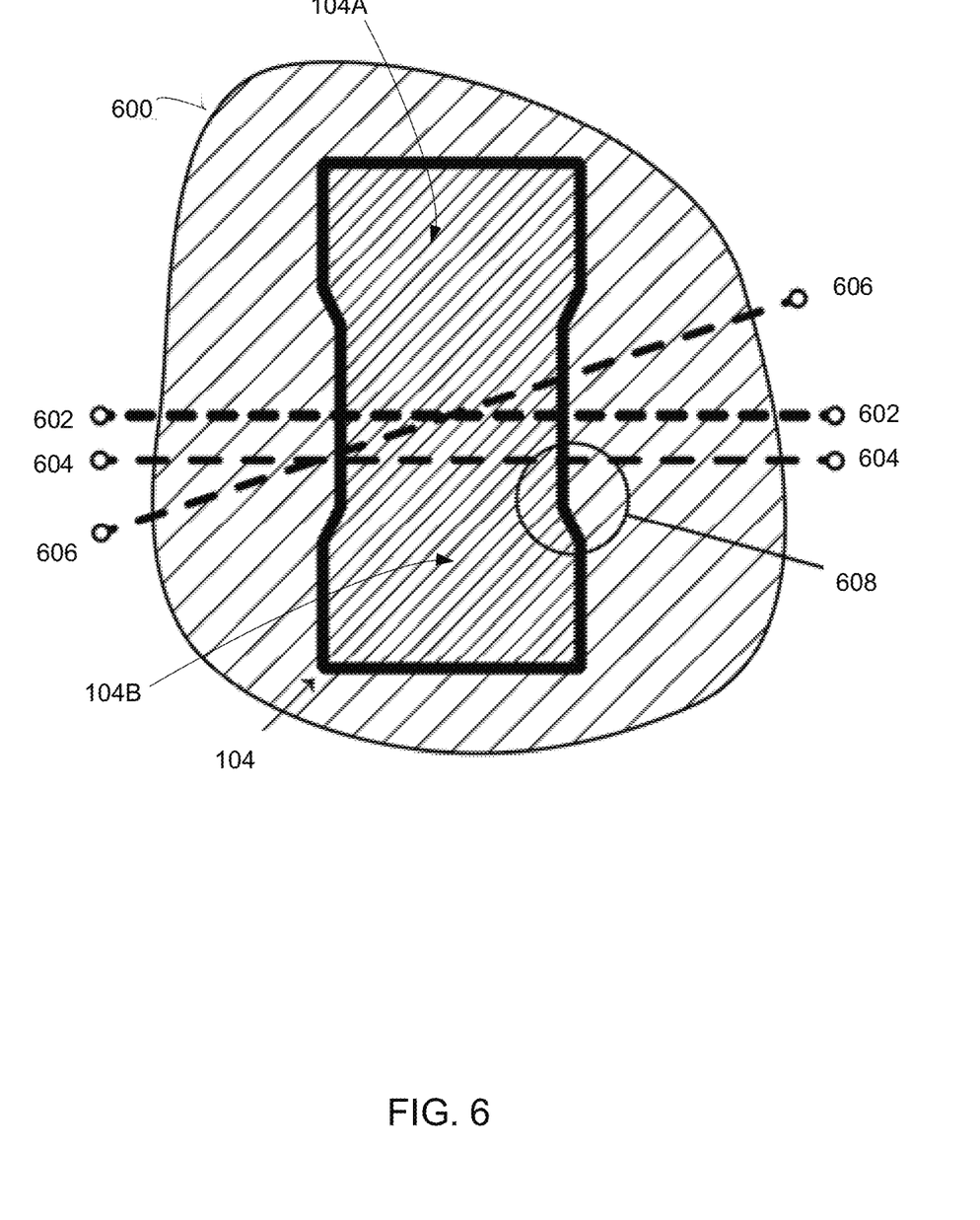
FIG. 6 depicts example bisections of a void, according to one embodiment.

Referring now also to FIG. 6, the void 104 can be divided into void space 104A and void space 104B, such that when an item 600 is divided into two parts, each part will retain one void space 104A, 104B. In a first embodiment, the void 104 can be divided at the center of the void 104 perpendicular to the long axis of the void 104. A first plane 602 can bisect the void 104 into two approximately equal void spaces 104A, 104B. In a second embodiment, the void 104 can be divided using a second plane 604 offset from the center of the void 104 perpendicular to the long axis of the void 104. In a third embodiment, the void 104 can be divided using an angled plane 606 that divides the void 104 at an angle relative to the long axis of the void 104. In these embodiments, each void space 104A, 104B can include a separate cavity. Each void space 104A, 104B taken together can form the void 104, where a plurality of planes can divide the void 104 into functional void spaces 104A,104B. Each void space 104A, 104B can also include at least part of the indented portion 608 of the void 104, for example as circled in FIG. 6. The indented portion can ensure that each void space 104A, 104B narrows near the aperture or opening such that a pin (not shown) can be retained in each void space 104A, 104B.

Figure 7:
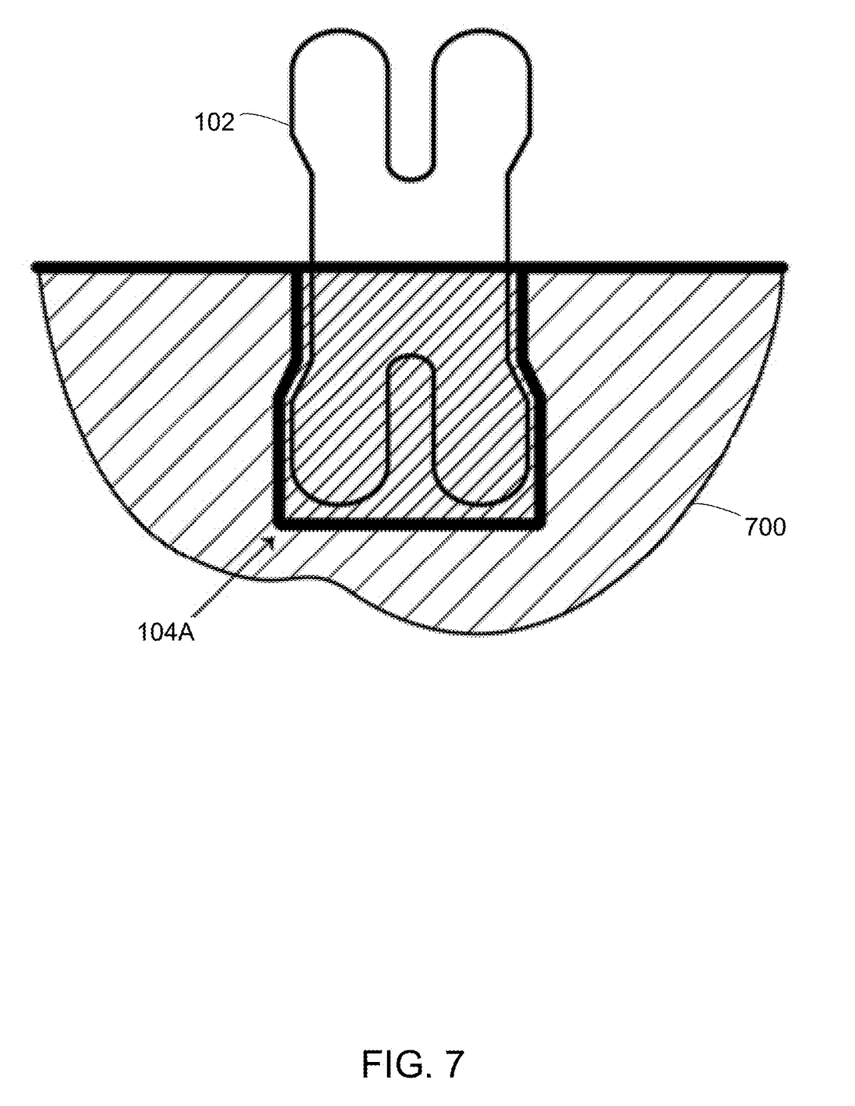
FIG. 7 depicts an insertion of a pin into a void, according to one embodiment.
Figures 8A, 8B, 8C, 8D:
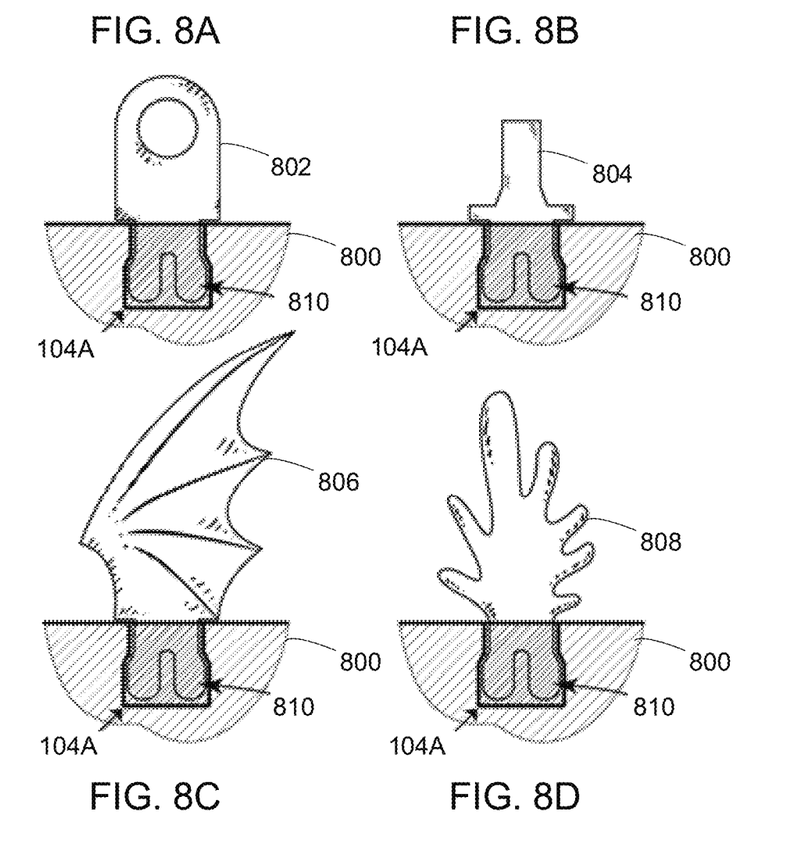
FIGS. 8A-8D depict the attachment of 3D-printable items incorporating a portion of a pin to an object having a void, according to one embodiment.

Referring now also to FIG. 7, a pin 102 can be inserted into a void space 104A of a fabricated item 700, for example an item 700 that has been 3D printed to include the void space 104A. In this embodiment, the other end of the pin 102 can be inserted into the void space of a different item (not shown) in order to be secured or connected to the item 700.

Referring now also to FIGS. 8A-8D, an object 802, 804, 806, 808 can include a pin portion 810 that can be configured to secure the object 802, 804, 806, 808 to an item 800 that includes a void space 104A. In various non-limiting embodiments, an object 802, 804 can include a utility feature such as a hole object 802 or a post object 804. For example, the hook object 802 can provide a hole through which a hook, loop, string or other means of attachment can be passed. In this way, the hole object 802 can provide the utility of allowing something to be tethered or attached to the item 800. In other non-limiting embodiments, an object 806, 808 can include an ornamental feature such as a wing object 806 or webbed object 808. For example, a wing object 806 can be inserted into an item 800 that is a toy to provide ornamental wings. Other objects having utilitarian, ornamental, or other features can be secured to an item 800 as would be understood by one of ordinary skill in the art.

Figure 9:
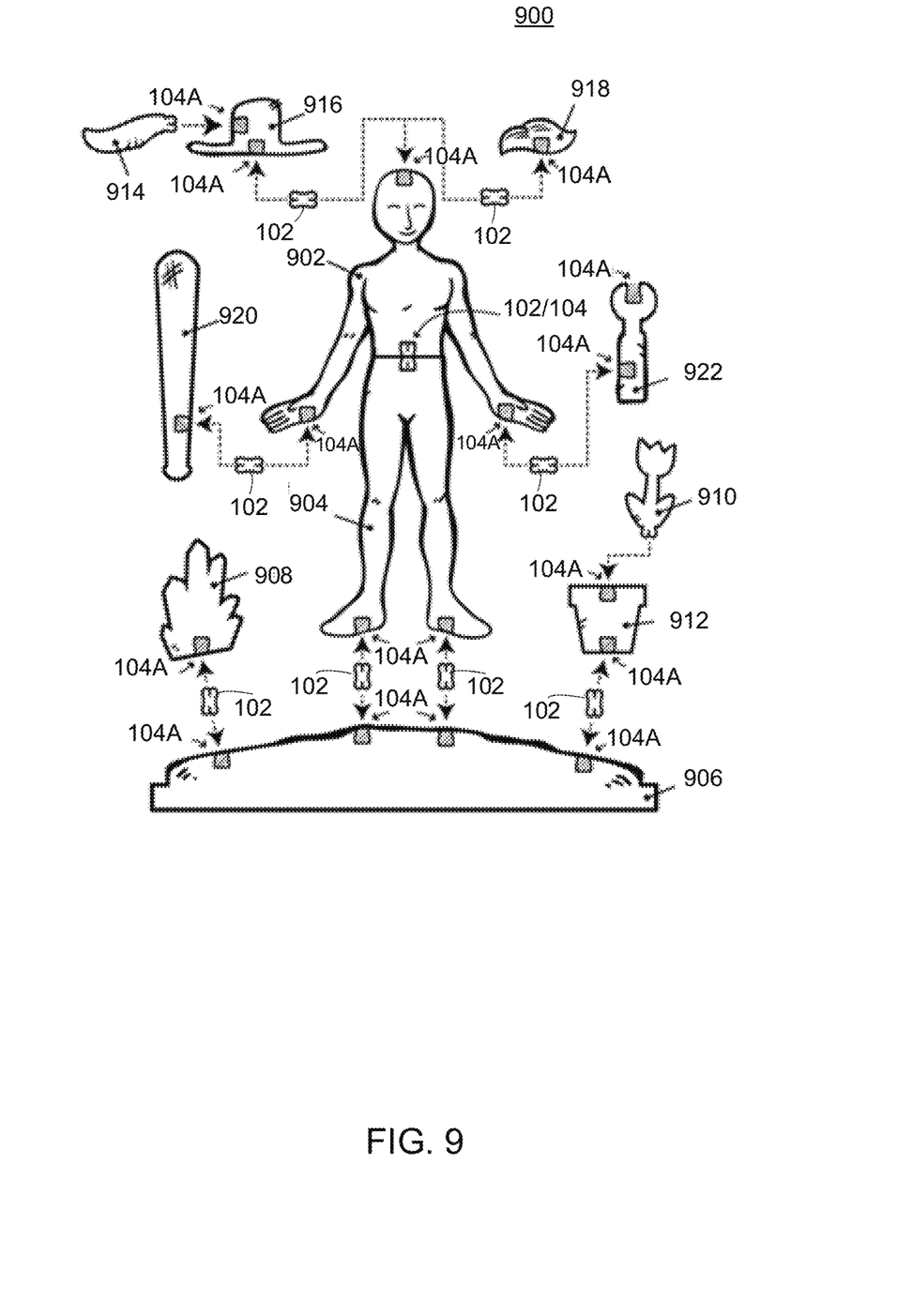
FIG. 9 depicts an assembly of example 3D-printable objects, according to one embodiment.

Referring now also to FIG. 9, an example toy item 900 is presented. The toy item 900 can include various objects 902, 904, 906, 908, 910, 912, 914, 916, 918, 920, 922 that can be attached together in various combinations. For example, an upper torso 902 can be attached to a lower torso 904 using a pin 102 and void 104 as described above. The lower torso 904 can be attached to a base 906 or stand using one or more pins 102 and voids 104 in the feet of the lower torso 904 and the base 906. A crystal 908 can similarly be attached to the base 906. A flower 910 can be attached to a flower pot 912 that can in turn be attached to the base 906. A feather 914 can be attached to a hat 916 that can be attached to the head of the upper torso 902. Alternatively, a hair piece or toupee 918 can be attached to the head of the upper torso 902. A bat 920 can be attached to a hand of the upper torso 902. A wrench 922 can be attached to the other hand of the upper torso 902. Because each object 902, 904, 906, 908, 910, 912, 914, 916, 918, 920, 922 can use the same pin 102 and void 104 system, any number of attachment combinations can be obtained while playing with the toy item 900. In a configuration, one or more of the pins 102 and voids 104 can be sized or shaped differently than other pins 102 and voids 104.

Figure 10:
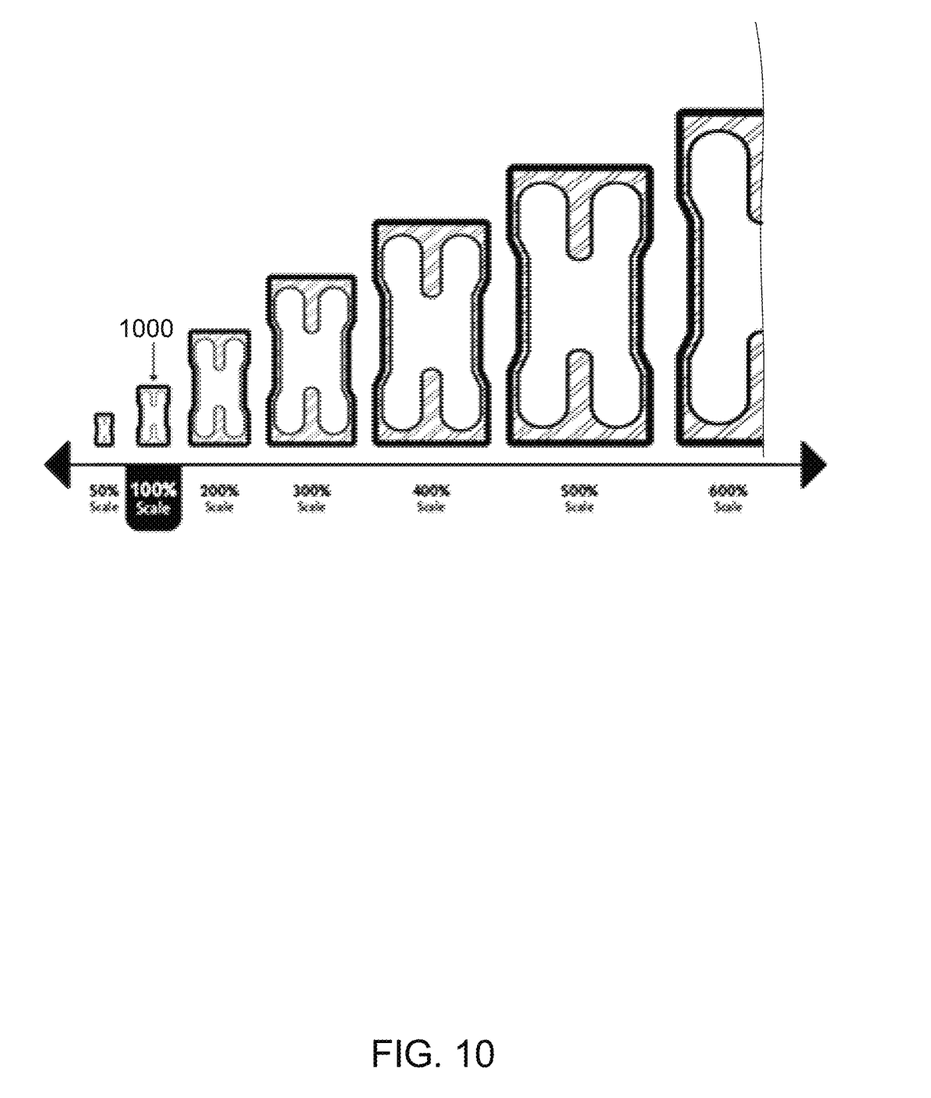
FIG. 10 depicts example sizes of pins and voids, according to one embodiment.

Referring now also to FIG. 10, the pin and void system 1000 can be resized based on the intended use in securing items together. Although illustrated in embodiments having a scale from 50% up to 600%, any suitable scale can use used.

Figure 11:
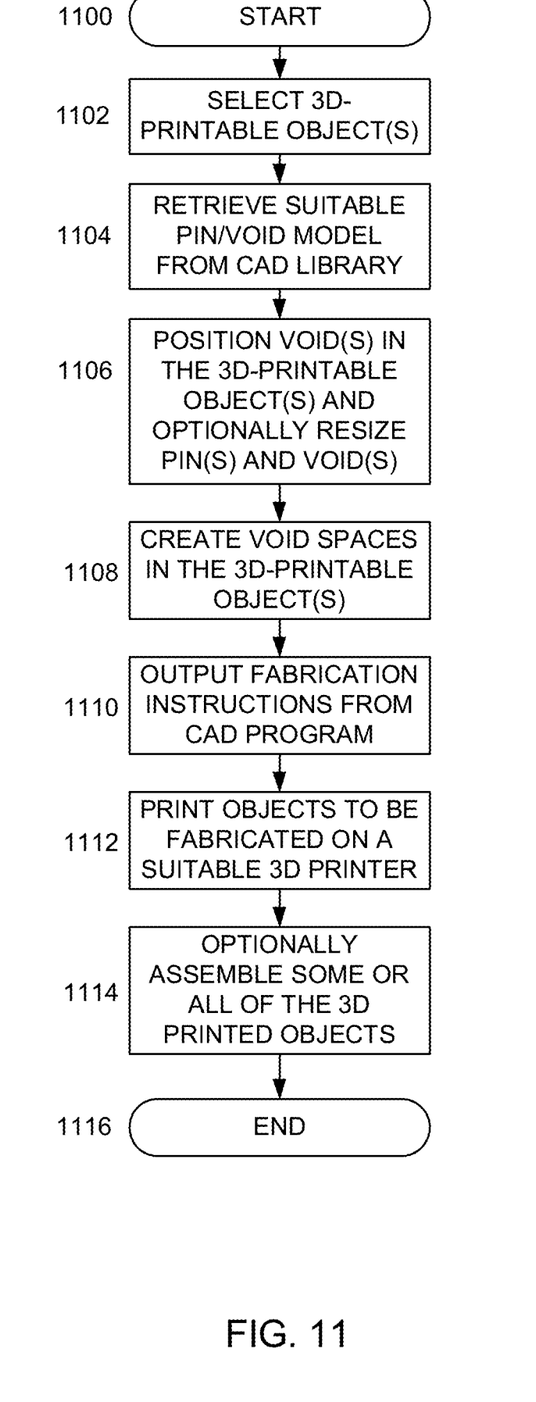
FIG. 11 depicts example operations for incorporating pins and voids into a 3D-printable object, according to one embodiment.

Referring now to FIG. 11, example operations for incorporating a pin and void system into a 3D-printable object are presented. Processing starts at start block 1100 and continues to process block 1102.

In process block 1102, a user of a CAD program selects a 3D-printable object to be fabricated. For example, a user can load an existing 3D-printable object or design a 3D-printable object in the CAD program, among other available options. Processing continues to process block 1104.

In process block 1104, a suitable pin and void template is loaded into the CAD program. For example, the pin and void template can be retrieved from a library of templates configured to be used with the CAD program. In another example, a suitable pin and void system can be created or adopted by a designer or user without departing from the scope of the invention, however so created or secured by the designer or user. Processing continues to process block 1106.

In process block 1106, the user can position the void at a desired place in the 3D-printable object to be fabricated. The user can optionally resize the pin and void. Processing continues to process block 1108.

In process block 1108, one or more void spaces are created in the 3D-printable object. For example, in a configuration the user can bisect the 3D-printable object such that a suitable void space remains in each part of the 3D-printable object as described above. In a configuration, the user can divide the 3D-printable object into multiple parts with multiple void spaces. In a configuration, the 3D-printable object is not bisected or divided, and instead one or more suitable void spaces are positioned in the 3D-printable object. Processing continues to process block 1110.

In process block 1110, instructions for fabricating the parts of the 3D-printable object and/or pin can be output from the CAD program. For example, one or more stereolithography files can be generated. In another example, instructions can be sent directly to a 3D printer. Other methods of processing to produce suitable instructions and/or data for fabricating one or more parts on a 3D printer are also contemplated as would be understood by one of ordinary skill in the art. Processing continues to process block 1112.

In process block 1112, one or more parts of the 3D-printable object can be fabricated, for example by printing on a 3D printer. In a configuration, one or more parts can be fabricated or obtained using other processes. For example, a pin formed by injection molding or stamping can be obtained instead of being 3D printed. Processing continues to process block 1114.

In process block 1114, the 3D-printable object optionally can be assembled using one or more pins to attach together one or more parts of the 3D-printed object. Processing terminates at end block 1116.

Some of the operations described in process blocks 1102 through 1114 can be performed in different orders without departing from the scope of the disclosure, as would be understood by one of ordinary skill in the art.

I claim:

1. A method of generating an object and an associated pin comprising:
    selecting an object to be fabricated;
    designing a pin and void template in the object with a computer aided design program;
    separating the object into a first part and a second part using the computer aided design program;
    designing a first void defined by the first part;
    designing a second void defined by the second part;
    designing a pin, wherein the pin is sized to engage the first void and the second void;
    printing at least one of the first part, the second part, and the pin with a 3D printer; and
    coupling the first part to the second part with the pin to assemble the object.

2. The method of claim 1, wherein the first void includes a first aperture defined by the first part and the second void includes a second aperture defined by the second part.

3. The method of claim 2, wherein the first aperture and the second aperture are sized such that the pin is retained therein upon insertion.

4. The method of claim 3, wherein the first aperture includes a first indented portion and the second aperture includes a second indented portion.

5. The method of claim 4, the pin including a first set of projections and a second set of projections, wherein the first set of projections engage the first void and the second set of projections engage the second void.

6. The method of claim 5, wherein each of the first set of projections and each of the second set of projections is a living hinge.

7. The method of claim 6, wherein each of the first set of projections is flexed inwardly for insertion into the first void and, once inserted, the first set of projections is flexed outwardly to secure the pin to the first part of the object.

8. The method of claim 7, wherein the pin has a substantially dog bone shaped configuration.

9. The method of claim 1, wherein the first void and the second void have substantially the same configuration.

10. The method of claim 1, wherein the first void and the second void cooperate to form a void shape that is substantially functional when divided by a plurality of planes.

11. An apparatus, generated at least partially using a 3D printer, comprising:
    (a) an object, the object being at least partially fabricated from a 3D printer, the object including;
        (i) a first part of the object, the first part of the object defining a first void; and
        (ii) a second part of the object, the second part of the object defining a second void; and
    (b) a pin, the pin having a first end and a second end, wherein the first end of the pin engages the first void of the object and the second end of the pin engages the second void of the object such that the first part is coupled with the second part to form the object.

12. The apparatus of claim 11, wherein the first void includes a first aperture defined by the first part and the second void includes a second aperture defined by the second part.

13. The apparatus of claim 12, wherein the first aperture and the second aperture are sized such that the pin is retained at least partially within the first void and the second void once inserted.

14. The apparatus of claim 13, wherein the first aperture includes a first indented portion and the second aperture includes a second indented portion.

15. The apparatus of claim 14, the pin including a first set of projections and a second set of projections, wherein the first set of projections engage the first void and the second set of projections engage the second void.

16. The apparatus of claim 15, wherein each of the first set of projections and each of the second set of projections is a living hinge.

17. The apparatus of claim 16, wherein each of the first set of projections is flexed inwardly for insertion into the first void and, once inserted, the first set of projections is flexed outwardly to secure the first end of the pin to the first part of the object.

* * * * *